(12) United States Patent
Faber

(10) Patent No.: US 6,888,810 B2
(45) Date of Patent: May 3, 2005

(54) WIRELESS COMMUNICATION DEVICE AND METHOD OF PREDICTING A FRAME RATE IN A CDMA COMMUNICATION SYSTEM

(75) Inventor: Ulrich Faber, Tokyo (JP)

(73) Assignee: NEC Corporation, Tokyo (JP)

( * ) Notice: Subject to any disclaimer, the term of this patent is extended or adjusted under 35 U.S.C. 154(b) by 734 days.

(21) Appl. No.: 09/730,545

(22) Filed: Dec. 7, 2000

(65) Prior Publication Data

US 2001/0004356 A1 Jun. 21, 2001

(30) Foreign Application Priority Data

Dec. 8, 1999 (JP) .......................................... 11-348432

(51) Int. Cl.[7] .............................................. H04B 7/216
(52) U.S. Cl. ..................... 370/335; 370/342; 370/468
(58) Field of Search ............................... 370/335, 342, 370/465, 468

(56) References Cited

U.S. PATENT DOCUMENTS

| | | | |
|---|---|---|---|
| 5,535,239 A | | 7/1996 | Padovani et al. |
| 5,537,410 A | * | 7/1996 | Li ................................ 370/465 |
| 5,627,845 A | | 5/1997 | Asano et al. |
| 6,108,372 A | * | 8/2000 | Tidemann et al. ........... 375/225 |
| 6,400,731 B1 | * | 6/2002 | Nitta ............................. 370/468 |
| 6,480,554 B1 | * | 11/2002 | Toskala et al. ............... 375/340 |
| 6,560,744 B1 | * | 5/2003 | Burshtein .................... 714/774 |
| 6,687,233 B1 | * | 2/2004 | Chen et al. ................... 370/253 |

FOREIGN PATENT DOCUMENTS

| | | |
|---|---|---|
| JP | 10-164003 | 6/1998 |
| JP | 11-55218 | 2/1999 |
| JP | 11-150522 | 6/1999 |
| JP | 11-163962 | 6/1999 |
| JP | 11-220778 | 8/1999 |
| JP | 2000-165351 | 6/2000 |
| JP | 2000-224651 | 8/2000 |
| JP | 2000-295119 | 10/2000 |
| WO | WO 97/05717 | 2/1997 |
| WO | WO 97/24848 | 7/1997 |
| WO | WO 97/37471 | 10/1997 |
| WO | WO 98/13941 | 4/1998 |
| WO | WO 98/19431 | 5/1998 |

OTHER PUBLICATIONS

Sheung Ching et al., "Rate Determination Algorithms in IS–95 Forward Traffic Channels", 1998 IEEE, pp. 2187–2191.

* cited by examiner

*Primary Examiner*—Chau Nguyen
*Assistant Examiner*—Christine Ng
(74) *Attorney, Agent, or Firm*—Foley & Lardner LLP (57) ABSTRACT

In a method of controlling a searcher used in a wireless communication device supplied with a sequence of baseband reception data signals divisible into a sequence of frames, a current frame and preceding frames are selected which satisfy a first relationship. A current and preceding frame rates are statistically processed to obtain frequencies of combinations of the current and the preceding frame rates and to store the frequencies. The first relationship is determined by a difference between a processing time of correlators and the like and a delay time of a delay unit. A next frame search rate judgement portion statistically processes frequencies of combinations of the current and the preceding frame rates so as to calculate a next frame rate candidate in accordance with the first relationship. The next frame rate is predicted by using the next frame rate candidate with reference to a second relationship similar to the first relationship.

21 Claims, 7 Drawing Sheets

WIRELESS COMMUNICATION DEVICE AND METHOD OF PREDICTING A FRAME RATE IN A CDMA COMMUNICATION SYSTEM

BACKGROUND OF THE INVENTION

This invention relates to a wireless communication device and a method of controlling a searcher in a CDMA (Code Division Multiple Access) system.

A recent attention tends to be focused on a CDMA system as a wireless or radio communication system which carries out communication between a base station and a plurality of mobile terminals by a wireless or radio signal within a service area or cell. This is because communication between the base station and a plurality of mobile terminals can be carried out by the same frequency within the same cell and, as a result, a frequency resource can be effectively used in the CDMA system.

As such a CDMA system, a direct sequence (DS)-CDMA system is known which directly modulates an information signal into a spread signal by a specific spread spectrum code peculiar to each mobile terminal. The DS-CDMA system makes it possible to spread the information signal into a very wide band. More specifically, communication from the base station to each mobile terminal is carried out through a forward link while communication from each mobile terminal to the base station is carried out through a backward or reverse link.

In general, the forward link includes a pilot channel and a traffic channel while the backward link includes a traffic channel without any pilot channel. At any rate, a receiver section of the base station and the mobile terminal must identify each channel from one another to detect a counterpart side on the communication.

In addition, it is to be noted in the CDMA system that the receiver section of each of the base station and the mobile terminal is given reception signals through different propagation paths which may be collectively called a multi-path. Therefore, the reception signals are inevitably subjected to interference on passing through the different propagation paths. Under the circumstances, the receiver section should reliably detect its own channel from the reception signals received through the multi-path. Taking this into consideration, the receiver section in the CDMA system is equipped with a searcher or searchers for searching its own channel which is arranged within a time slot predetermined for the receiver section.

In the interim, the above-mentioned DS-CDMA system includes a mobile communication system of DS-CDMA which is implemented in compliance with the IS 95 standard prescribed by ANSI (American National Standards Institute). In the mobile communication system, communication from each mobile terminal to the base station is carried out through the reverse or upward link by using a sequence of burst like frames from each mobile terminal. This mobile communication system is helpful to save power consumption in each mobile terminal.

Specifically, each of the frames is divided into sixteen slots for arranging an audio data signal or any other data signal given in the form of a digital signal. In this event, the digital signal is usually obtained by encoding a sound signal into digital samples by a codec and by carrying out predetermined code conversion about the digital samples by a vocoder included in the mobile terminal. Herein, it is to be noted that the digital samples are converted by the vocoder into different rates of the digital signal, as an amount of the digital samples is varied in each frame.

The digital signal of different rates is arranged in each frame at different frame rates determined by the number of data transmission slots in each frame. As a rule, the frame rates are classified into four rates, namely, a full rate, a half rate, a quarter rate, and an eighth rate. The digital signals are arranged in all of the slots in each frame at the full rate while the digital signals are arranged in half slots of sixteen slots at the half rate. Likewise, the quarter and the eighth rates are for arranging the digital signals in four and two slots included in each frame, respectively.

In U.S. Pat. No. 5,535,239 issued to Padovani et al, disclosure is made about a data burst randomizer which is used in a transmission system and which serves to determine power control groups in accordance with a predetermined algorithm by monitoring predefined bits in a previous frame. However, Padovani et al never point out any problem which might occur on reception of the digital signals of variable frame rates.

Practically, when such digital signals of variable frame rates are received by a conventional receiver section, a searcher in the conventional receiver section is put into an active state, regardless of the frame rates of a reception signal. In other words, the searcher is always operated in tune with the full rate. Accordingly, when transmission is made at any other rates than the full rate, the searcher in the receiver section is uselessly operated and gives rise to a useless operation of any other peripheral circuits related to the searcher for a quiescent period namely, an unvoiced period. This shows that probability of searching an unvoiced slot in the conventional searcher is determined by a ratio of the voiced period to a whole time.

Moreover, such a useless searching operation in the searcher brings about deteriorating a quality of communication due to interference and noise caused to occur in the unvoiced period or slots. To the contrary, it fears that a serious loss of data takes place owing to misdetection of a desired slot.

Herein, consideration will be made about operation which is carried out in a mobile terminal during soft handoff procedure from a current base station to a new base station. In this event, the new base station can not detect a location of the mobile terminal before demodulation of a data signal arranged in the traffic channel, because of absence of any access channel in the reverse link. During the handoff procedure or operation, it is very important to accurately acquire a desired slot and to detect a data signal arranged in the traffic channel of the desired slot, so as to maintain the quality of communication and to avoid a call drop.

As mentioned above, when a searching operation of the searcher is executed in connection with slots which include no data, superfluous interference takes place not only during the soft handoff procedure but also during a normal communication, which results in degradation of the quality of communication.

In order to solve the above-mentioned problem, the instant inventor has already proposed a searcher control method and device in Japanese Unexamined Patent Publication No. 2000-165351 (the corresponding U.S. patent application Ser. No. 09/449,548). In the proposed method and device, burst candidate slot information is calculated from a current transmission data signal and is used to control a searcher or searchers. In this event, the burst candidate slot information is determined by a data burst randomizer (DBR2).

However, the method and device are disadvantageous in that slots with data bursts might not be searched and a long time is often required to acquire paths by the searcher or searchers when strong fading or the like take place in a communication environment.

At any rate, no consideration is made about an influence of a delay time introduced before the searcher or searchers. Specifically, a frame rate signal can be detected by a receiver of the device to specify each frame rate and is sent to the DBR to control the searcher or searchers. Since several frames are required to detect the frame rate signal, searching operation of the searcher or searchers is inevitably delayed from a latest received frame. As a result, the method and device described in the above-mentioned application can realize neither fast acquisition of the paths nor accurate prediction of the frame rate.

SUMMARY OF THE INVENTION

It is an object of this invention to provide a wireless communication device which is used for a DS/CDMA system and which can quickly determine a latest received frame rate without any interference.

It is another object of this invention to provide a wireless communication device of the type described, which can accurately predict the latest received frame rate.

It is still another object of this invention to provide a wireless communication device of the type described, which is used not only in a base station but also in a mobile terminal.

It is yet another object of this invention to provide a method of quickly and accurately predicting the latest received frame rate from previous frame rates.

It is another object of this invention to provide a method of the type described, which can quickly cope with a change of a communication environment.

It is another object of this invention to provide a method of the type described, which can precisely predict the latest received frame rate in consideration of a delay time which is required to detect a frame rate.

A wireless communication device is for use in a DS/CDMA mobile communication system. The wireless communication device is operable in response to a sequence of reception signals divisible into a plurality of frames each of which has a frame rate and which is further divided into a plurality of slots. According to an aspect of this invention comprises processing means for statistically processing preceding frame rates in previously received ones of the frames to produce a result of statistical processing, predicting means for predicting a later one of the frame rates in a next one of the frames on the basis of the result of statistical processing to produce a predicted frame rate of the later one of the frame, and executing means for executing a predetermined operation within candidate ones of the slots determined for the predicted frame rate.

The executing means may comprise a spread code generator for generating a spread code and a calculating unit for calculating the candidate slots from the predicted frame rate and the spread code. In addition, the executing means may further comprise a demodulating unit for demodulating the reception signal with reference to the candidate slots into a demodulated signal.

According to another aspect of this invention, a circuit is operable in response to a sequence of frame rate signals derived from a sequence of reception signals in a wireless communication device of a mobile communication system. The reception signal sequence includes a reference frame, a previous frame sequence preceding the reference frame, and a later frame following the reference frame while the circuit is used for calculating a later frame rate of the later frame. The circuit comprises processing means for statistically processing a reference frame rate extracted from the reference frame and a previous frame rate extracted from the preceding frame sequence to successively store a frame rate candidate in the later frame as a result of statistically processing and selecting means for selecting the frame rate candidate to produce the frame rate candidate as the later frame rate.

The wireless communication device has a processing time for decoding the reception signal sequence into a sequence of reception signals. In this event, the producing means comprises an input register which has a plurality of stages successively loaded with each frame rate extracted from the reception signal sequence at each frame, a frequency storage section, coupled to a plurality of the stages of the input register dependent on the processing time, for successively storing a combination of the frame rate given from the reference and the previous frame rates;

a candidate calculator for calculating the frame rate candidate of the later frame by statistically detecting frequencies of each combination, and a candidate register for successively registering the frame rate candidate of the later frame.

In addition, the selecting means comprises a later frame selector, coupled to the stages of the input register that are dependent on the processing time, for selecting the frame rate candidate by a combination of the frame rates derived from the stages of the input register.

According to still another aspect of this invention, a method is for predicting a frame rate in a selected one of frames that follows a reference frame with a reference frame rate. The method comprises the steps of statistically processing the reference frame rate and a previous frame rate of a previous frame preceding the reference frame to calculate a frame rate candidate in the selected one of the frames and producing the frame rate candidate as the frame rate predicted.

The statistically processing step comprises successively storing the previous and the reference frame rates, accumulating each combination of the previous and the reference frame rates to statistically detect a frequency of each combination, and obtaining the frame rate candidate by using the frequency of each combination.

According to yet another aspect of this invention, a method is for use in predicting a latest frame rate of a latest received frame from preceding frame rates. The method comprises the steps of extracting a sequence of frame rate signals from a sequence of reception signals and predicting the latest frame rate of the latest received frame by processing previous ones of the frame rate signals preceding the latest received frame in consideration of a delay time for extracting the frame rate signal sequence.

DESCRIPTION OF THE PREFERRED EMBODIMENTS

Figure 1:
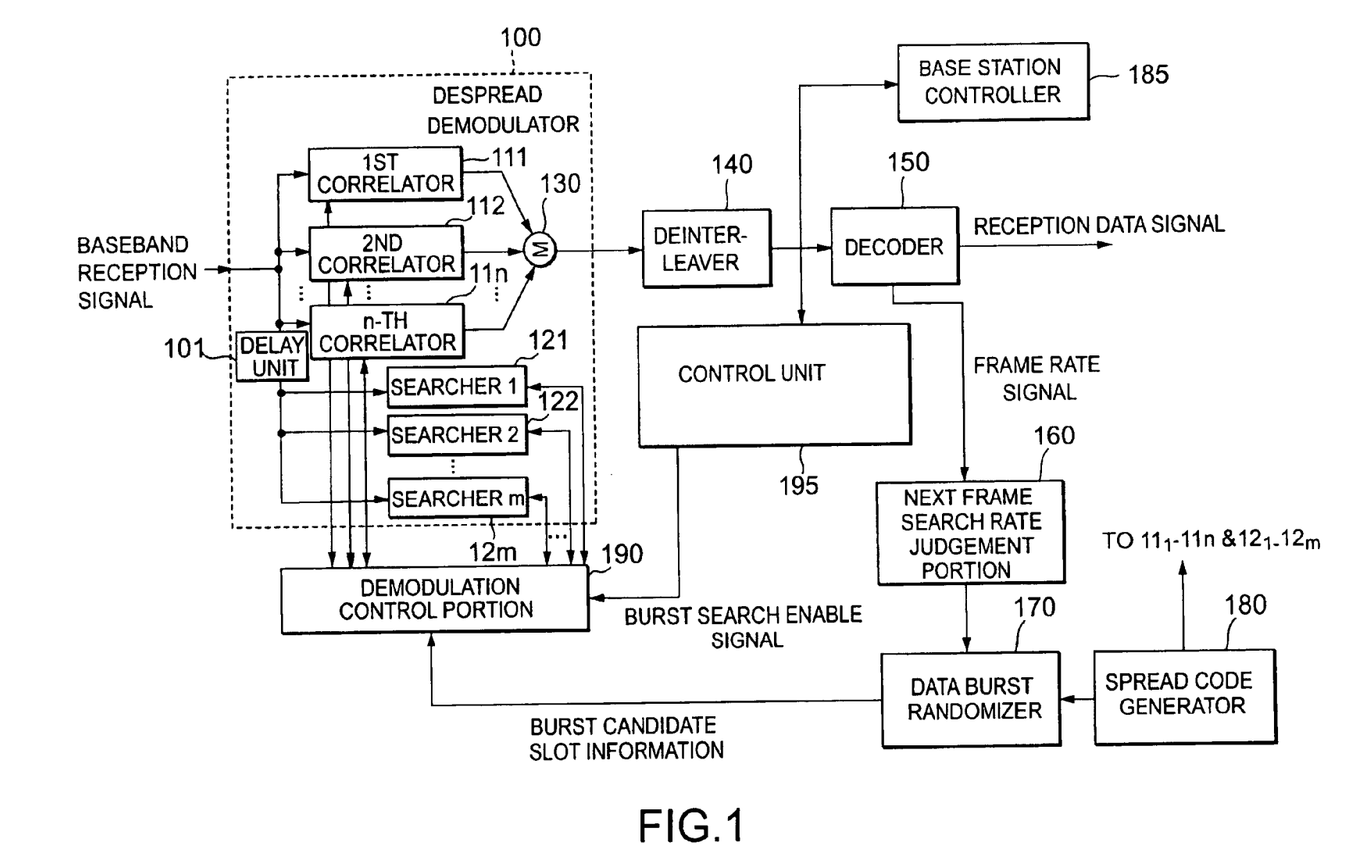
FIG. 1 shows a block diagram of a wireless communication device according to an embodiment of this invention.

Referring to FIG. 1, a wireless communication device according to an embodiment of this invention is applicable to a DS (direct sequence)-CDMA (code division multiple access) system which has a base station and a plurality of mobile terminals communicable with the base station. The illustrated wireless communication device is specified only by a wireless communication device, with a transmitter section omitted from this figure.

The wireless communication device is applicable to either the base station or each mobile terminal, although the following description will be mainly made on the assumption that the wireless communication device is used in the base station.

Herein, it is noted that the wireless communication device included in each base station is coupled to a base station controller 185 and is operated under control of the base station controller 185, as known in the art.

As shown in FIG. 1, the wireless communication device has a despread demodulator 100, a deinterleaver 140, and a decoder 150 all of which may be collectively and simply referred to as a receiver. Furthermore, the illustrated wireless communication device has a demodulation control portion 190, a data burst randomizer (will be often abbreviated to DBR) 170, a spread code generator 180, a next frame search rate judgment portion 160, and a control unit 195.

The control unit 195 is coupled to the base station controller 185 to deliver the burst search enable signal to the demodulation control portion 190 under control of the base station controller 185.

The demodulation control portion 190 is operable to control the despread demodulator 100 of the receiver in a manner to be described later in detail. To this end, the illustrated demodulation control portion 190 is coupled to the control unit 195 and the DBR 170 and is supplied with the burst search enable signal and burst candidate slot information from the control unit 195 and the DBR 170, respectively. The burst search enable signal will be described later with reference to FIG. 2. It suffices to say that the burst search enable signal takes either a logic "1" level or a logic "0" level. On the other hand, the burst candidate slot information is sent from the DBR 170 in a manner to be mentioned later and is indicative of a slot candidate in a next frame or a latest received frame received at the despread demodulator 100.

In the example illustrated, it is assumed that the despread demodulator 100 is given, as an input signal, a baseband reception signal which is demodulated from a wireless or radio signal of a high frequency band according with the DS-CDMA and that the receiver is operable as a baseband demodulator of the wireless communication device.

The baseband reception signal is transmitted from a mobile terminal (not shown) and is representative of a sequence of baseband reception signals sent from the mobile terminal. The baseband reception signal sequence is divisible into a plurality of frames each of which is further divided into a plurality of slots.

More specifically, the despread demodulator 100 has first through n-th correlators 111, 112, ..., 11n, a rake combiner or adder 130 for phase adjusting and summing up output signals from the first through the n-th correlators 111 to 11n, and a delay unit 101 for delaying the baseband reception data signals, where n is a positive integer. In addition, the despread demodulator 100 further has first through m-th searchers 121 to 12m for searching for an adequate path from the baseband reception data signals which are delayed, where m is also a positive integer. The illustrated demodulator 100 is controlled by the demodulation control portion 190. In the illustrated example, the demodulation control portion 190 serves to control a search operation of each of the first through m-th searchers 121 to 12m.

The next frame search rate judgment portion 160 is supplied from the decoder 150 with a frame rate signal representative of a frame rate of a current frame which may be currently decoded by the decoder 150 and which may be referred to as a reference frame. Furthermore, the next frame search judgment portion 160 calculates, on the basis of the codec information, a frame rate which is set at the beginning of the search operation in each searcher 12i. The frame rate set by the next frame search judgment portion 160 is given to the data burst randomizer (DBR) 170 together with a spread code generated by the spread code generator 180. In this event, the frame rate of the reference frame may be called a current or reference frame rate and precedes a latest received frame arriving at the despread demodulator 100. In other words, the latest received frame is delayed in relation to the latest received frame, as will become clear as the description proceeds.

Supplied with the frame rate and the spread code, the DBR 170 calculates the burst candidate slot information to supply the same to the demodulation control portion 190.

Responsive to the burst search enable signal and the burst candidate slot information, the demodulation control portion 190 controls start times of the first through the m-th searchers 121 to 12m in accordance with a predetermined algorithm which will later be described. Therefore, the demodulation control portion 190 may be simply referred to as a control portion for controlling each searcher 12i included in the despread demodulator 100.

Herein, it is to be noted that the spread code generator 180 delivers the spread codes not only to the DBR 170 but also to the first through the n-th correlators 111 to 11n and the first through the m-th searchers 121 to 12m of the despread demodulator 100. The spread codes are used in the first through the n-th correlators 111 to 11n and the first through the m-th searchers 121 to 12m to detect correlations between the baseband reception signal and the spread codes, although not shown in FIG. 1.

In the illustrated example, it is to be noted that the spread codes sent to both the DBR 170 and the searcher 121 to 12m are delayed by a delay time equal to the delay time of the delay unit 101 so as to adjust timing. On the other hand, the first through the n-th correlators 111 to 11n are given the spread codes without any delay.

The first through the n-th correlators 111 to 11n and the first through the m-th searchers 121 to 12m are operated under control of the demodulation control portion 190.

The demodulation control portion 190 illustrated in FIG. 1 supplies the searchers 121 to 12n of the despread demodulator 100 with a start time and a search time width for searching to control the searchers 121 to 12n. When the searcher 12i finishes the searching operation, a peak time at which an energy peak appears in the baseband reception signal is sent from each searcher 12i through the demodulation control portion 190 to the the despread demodulator 100. In the despread demodulator 100, the first through the n-th correlators 111 to 11n are controlled by the demodulation control portion 190 so that the energy to interference (Eb/No) becomes maximum in the rake combiner 130. Thus, the first through the n-th correlators 111 to 11n are operated in dependency upon results obtained by the searchers 12i. In any event, an operation time or duration of each searcher 12i depends on the burst candidate slot information given from the data burst randomizer 170.

Figure 2:
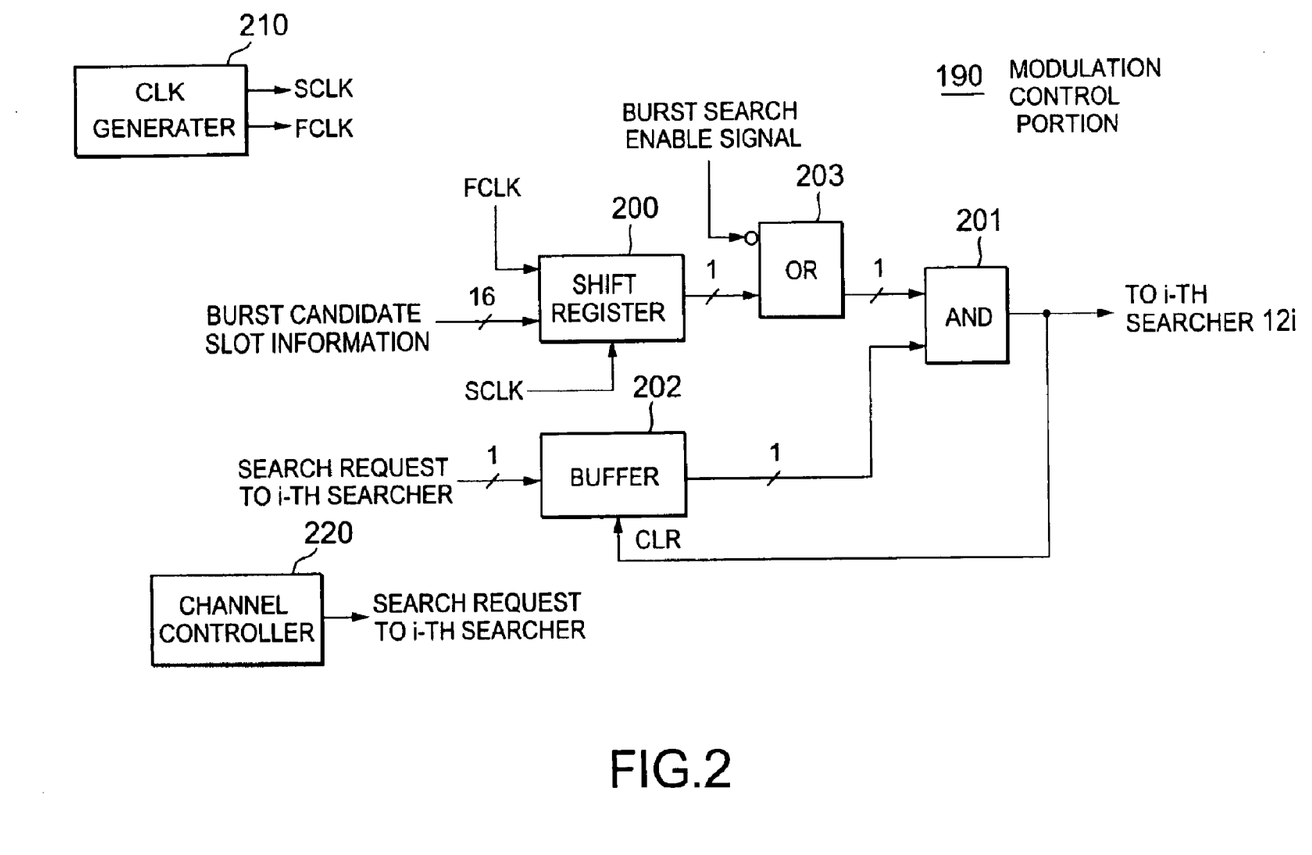
FIG. 2 shows a block diagram of a demodulation control portion used in the wireless communication device illustrated in FIG. 1.

Referring to FIG. 2, the demodulation control portion 190 has a timing control portion to control each searcher (specified by the i-th searcher 12i which is shown as a representative of the first through the m-th searchers 121 to 12m illustrated in FIG. 1). The illustrated timing control portion of the demodulation control portion 190 is supplied from the data burst randomizer 170 with the burst candidate slot information which is representative of slot candidates in the next frame and which is composed of sixteen bits. In the illustrated example, the burst candidate slot information of sixteen bits is given in parallel to a shift register 200, as shown in FIG. 2.

As shown in FIG. 2, the illustrated timing control portion includes a clock generator 210 for generating a frame clock Fclk and a slot clock Sclk and a channel controller 220 for producing a search request to the i-th searcher 12i. Both the clock generator 210 and the channel controller 220 are operable under control of the control unit 195 illustrated in FIG. 1.

The frame clock Fclk and the slot clock Sclk are delivered to the shift register 200 to store the burst candidate slot information in synchronism with the frame clock Fclk and to read the same bit by bit in synchronism with the slot clock Sclk. As a result, the burst candidate slot information is converted by the shift register 200 into a series of sixteen bits which is sent to an OR gate 203 as a serial bit sequence. In other words, parallel to serial conversion is carried out by the shift register 200.

Herein, it is to be noted that the logic "1" level of each bit of the serial bit sequence is indicative of an available slot corresponding to each bit while the logic "0" level is indicative of an unused slot which is not used for searching. Specifically, the available slot is a burst candidate slot which includes any data while the unused slot is a burst candidate slot which includes no data, as readily understood from the above.

The OR gate 203 illustrated in FIG. 2 is supplied from the control unit 195 with an inverted burst search enable signal on one hand and with the above-mentioned serial bit sequence on the other hand. The resultant OR gate 203 executes a logical OR operation between the inverted burst search enable signal and the serial bit sequence. This shows that, when the burst search enable signal takes the logic "1" level, the serial bit sequence is sent through the OR gate 203 as an OR gate output signal with the serial bit sequence kept unchanged. On the other hand, when the burst search enable signal takes the logic "0" level, the logic "1" level is always produced from the OR gate 203 as the OR gate output signal, regardless of the serial bit sequence.

The OR gate output signal is delivered to an AND gate 201 which is given the search request read out of the buffer 202 and the OR gate output signal sent from the OR gate 203. In consequence, the AND gate 201 produces the logic "1" level signal as an AND gate output signal when both the OR gate output signal and the search request take the logic "1" levels, respectively. The AND gate output signal of the logic "1" level is sent to the i-th searcher 12i as a search operation start signal. This shows the i-th searcher 12i starts its searching operation only when the AND gate output signal takes the logic "1" level.

The AND gate output signal is fed back to the buffer 202 to clear the search request stored in the buffer when it takes the logic "1" level. Stated otherwise, the search request stored in the buffer 202 is cancelled by the AND gate output signal of the logic "1" level when the i-th searcher 12i starts the search operation in response to the search operation start signal sent from the AND gate 201.

Thus, the i-th searcher 12i executes the search operation within a slot indicated by the illustrated timing control portion of the demodulation control portion 190. In other words, the illustrated timing control portion can find the slot which is appropriate for the searching operation of the i-th searcher 12i.

More specifically, let the burst search enable signal take the logic "0" level and be indicative of a disenable state. In this event, when the search request is issued from the channel controller 220 under control of the control unit 195, the search operation is executed in the i-th searcher 12i within a next slot immediately after the search request.

On the other hand, let the burst search enable signal take the logic "1" level and be indicative of the enable state. In this case, the i-th searcher 12i executes the search operation at the slot indicated by the burst candidate slot information sent from the data burst randomizer 170.

Since the illustrated wireless communication device is used in the base station, a plurality of the spread codes are produced from the spread code generator 180 and delivered to the first through the n-th correlators 111 to 11n.

On the other hand, when the wireless communication device is used in the mobile terminal, a single spread code assigned to the mobile terminal is generated by the spread code generator 180 and is delivered to the correlators 111 to 11n.

Inasmuch as the illustrated wireless communication device is included in the base station, the wireless communication device monitors a traffic channel or a communication channel within an upward or a reverse link directed from each mobile terminal to the base station. On the other hand, when the wireless communication device according to this invention may be used in each mobile terminal, a forward or downward traffic channel in a downward link from the base station to each mobile terminal is monitored by the wireless communication device.

Referring to FIG. 1 along with FIGS. 3, 4, 5, and 6, description will be mainly made about operation of the next frame search rate judgement portion 160 illustrated in FIG. 1.

At first, the baseband reception signal is given at an input terminal of the despread demodulator 100 in the form of a sequence of baseband reception data signals. As known in the art, the baseband reception signal is obtained by demodulating the radio signal supplied through an antenna, a high frequency amplifier, a mixer, a local oscillator, an intermediate frequency amplifier, and a demodulation circuit (not shown).

Herein, it is to be noted that a transmission signal which is modulated on a transmitter side in the manner determined in the DS-CDMA system is received through a plurality of paths as the reception signal sequence. This shows that the baseband reception signal is reproduced by summing up a plurality of base band data signals passing through a plurality of different paths.

Specifically, the baseband reception signal is given through the input terminal to the despread demodulator 100 which is controlled by the demodulation control portion 190 mentioned before.

The despread demodulator 100 of the wireless communication device shown in FIG. 1 has the rake combiner 130 together with the correlators 111 to 11n and the searchers 121 to 12m and produces a combined and interleaved output signal as an interleaved baseband signal. The interleaved baseband signal is deinterleaved by the deinterleaver 140 into a deinterleaved baseband signal which is given to the decoder 150. The decoder 150 decodes the deinterleaved baseband signal into a reception data signal at every frame. In other words, the baseband reception signal is decoded into the reception data signal at every frame through the despread demodulator 100, the deinterleaver 14, and the decoder 150.

As shown in FIG. 1, the next frame search rate judgment portion 160 is supplied with a frame rate signal from the decoder 150 and calculates a search rate or a frame rate from the frame rate signal to designate a frame rate received by the despread demodulator 100. Since the frame rate calculated by the next frame search rate judgement portion 160 is calculated in conjunction with the reference or current frame preceding the latest received frame, it is noted that the calculated frame rate is representative of a predicted frame rate of the latest received frame.

In the illustrated example, let each frame be divided into sixteen slots, as mentioned before, and the number of the frame rate be generally denoted by Rnum. The frame rate number Rnum may be equal to four in the illustrated example. In the example illustrated, the four rates are assumed to be composed of a full rate, a half rate, a quarter rate, and an eighth rate, either one of which is selected in each frame, and the frame rate is decreased from the full rate to the eighth rate.

Under the circumstances, it is readily understood that the frame which is detected by the decoder 150 is delayed relative to each frame of the baseband reception signal given to the despread demodulator 100. Accordingly, the next frame search rate judgement portion 160 must predict and determine the latest or next frame rate of the baseband reception signal in consideration of a delay time between the baseband reception signal and the frame rate signal. Herein, the delay time is determined by both a processing time in the despread demodulator 100, the deinterleaver 140, and the decoder 150 and an additional delay time given to the delay unit 101. At any rate, the processing time is representative of a time interval between a time instant arriving at the input terminal of each frame and a time at which the frame rate signal is produced from the decoder 140. For brevity of description, the processing time and the additional delay time are assumed to be represented by p (frames) and d (frames). For example, the processing time is equal to 8 frames while the additional delay time is equal to 3 frames.

As illustrated in FIG. 1, the first through the n-th correlators 111 to 11n are operable in response to the baseband reception signal subjected to no delay. On the other hand, the first through the m-th searchers 121 to 12m are supplied through the delay unit 101 with the baseband reception signal delayed by d frames. In addition, the decoder 150 produces the frame rate signal of the current or reference delayed by p frames in relation to the baseband reception signal and which is depicted by (1).

Under the circumstances, the next frame search rate judgement portion 160 is operable to predict the latest frame rate of the latest received frame which arrives at the input terminal of the despread demodulator 100 the p frames after the current frame. In addition, the first through the m-th searchers 121 to 12m should be operated in the same frame as the first through the n-th correlators 111 to 11n, although they are supplied with the baseband reception signal delayed by d frames by the delay unit 101 in FIG. 1.

Taking the above into consideration, it is preferable that the latest frame rate of the latest received frame is obtained as the next frame rate with reference to both the frame rate signal of the current frame (1) and the delay time d of the delay unit 101. Simply, the illustrated next frame search rate judgement portion 160 predicts the next frame rate from the frame rate signal and the delay time d in a manner to be described later, so as to operate both the first through the n-th correlators 111 to 11n and the first through the m-th searchers 121 to 12m within the same frame.

Figure 3:
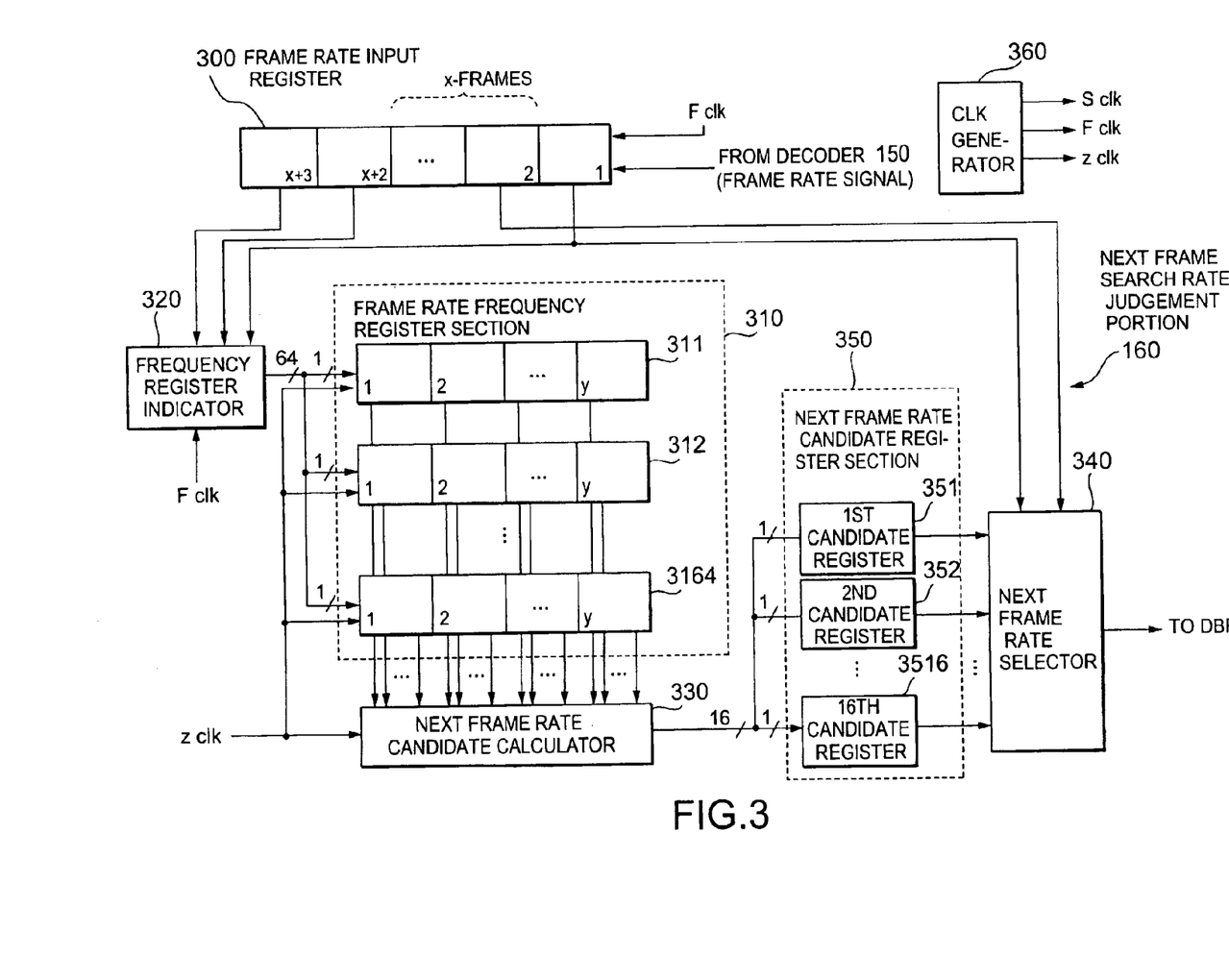
FIG. 3 shows a block diagram of a next frame search rate judgement portion illustrated in FIG. 1.

In FIG. 3, prediction is carried out in the next frame search rate judgement portion 160 on the assumption that a difference between p (frames) and d (frames) is represented by x (frames) and that the frame rate number Rnum is equal to four. Thus, the difference x is given be p-d and may be equal to 5 when p and d are equal to 8 and 3, respectively. In general, the additional delay time d of the delay unit 101 is shorter than the processing time p of the receiver.

In this event, it is found out that monitoring only the frame rate signal obtained from the current frame can not give an accurate next search rate of the arrival frame and makes it difficult to cope with rapid change of communication environment. This results from a time difference between the latest received frame and the current frame, as described before.

In order to increase probability of acquiring an accurate next frame rate and to quickly and accurately determine the search rate, the inventor has now proposed a method of statistically processing a plurality of previous frame rates in a plurality of previous frames preceding the latest received frame to detect the latest received frame rate or search rate of the latest received frame. The plurality of the previous frames include the current frame and frames preceding the current frame.

In FIG. 3, the current frame rate of the current frame (1) and two frame rates in two previous frames are used by the next frame search rate judgement portion 160 to determine the next frame rate of the latest received frame received at the input terminal of the despread demodulator 100 (FIG. 1). Thus, three frame rates are used to carry out statistical processing to determine the next or latest frame rate in the illustrated example. However, more than three frame rates can be available for determining the next frame rate. Taking this into account, the frame number of the frames used for determining the next frame rate may be represented by Fnum hereinafter. From this fact, it is readily understood that the frame number Fnum becomes equal to three in the illustrated example.

Specifically, the illustrated next frame search rate judgement portion 160 uses the current frame rate of the current frame along with the two previous frames which are depicted by (x+3) and (x+2) remote from the current frame (1) by (x+2) and (x+1) frames, respectively. Thus, the remaining two previous frames except the current frame are selected in relation to the time difference x between the processing time p and the delay time d, mentioned above.

Now, description will be made about operation of the next frame search rate judgment portion 160 in detail. As shown in FIG. 3, the next frame search rate judgement portion 160 has a frame rate input register 300, a frame rate frequency register section 310, and a frequency register indicator 320. Furthermore, a next frame rate candidate calculator 330, a next frame rate selector 340, and a next frame rate candidate register section 350, and a clock generator 360 are also included in the next frame search rate judgement portion 160.

The frame rate signal which is extracted from the reception signal sequence is successively delivered from the decoder 150 (FIG. 1) to the frame rate input register 300 which has first through (x+3)-th stages numbered from (1) to (x+3) in FIG. 3. The frame rate signal is at first stored in the first stage (1) of the frame rate input register 300 and is successively shifted towards the (x+3)-th stage in response to a sequence of the frame clock Fclk produced by the clock generator 360. It is to be stated here that the frame rate signal is representative of either one of the four frame rates (Rnum=4) composed of the full rate, the half rate, the quarter rate, and the eighth rate in the illustrated example, as mentioned before.

As shown in FIG. 3, the first, the (x+2)-th, and the (x+3)-th stages of the frame rate input register 300 are connected to the frequency register indicator 320 which serves to monitor and detect states of the above-mentioned three stages. Inasmuch as each of the first, the (x+2)-th, and the (x+3)-th stages is loaded with the frame rate signal which is representative of either one of four rates and which is composed of two bits, the illustrated frequency register indicator 320 monitors and detects each of 64 (=4×4×4) states of the three stages. This means that the number of the states to be detected by the frequency register indicator 320 is equal to four to third power ($4^3$) and can be therefore generalized by $Rnum^{(Fnum)}$.

In other words, the frequency register indicator 320 detects each of the sixty-four states in the frame rate input register 300 to produce an index signal indicative of an index idx for identifying the sixty-four states. To this end, the frequency register indicator 320 calculates the index idx in a manner illustrated in FIG. 4.

For brevity of description, contents of the first, the (x+2)-th, and the (x+3)-th stages of the frame rate input register 300 are depicted by [1], [x+2], and [x+3], respectively.

Figure 4:
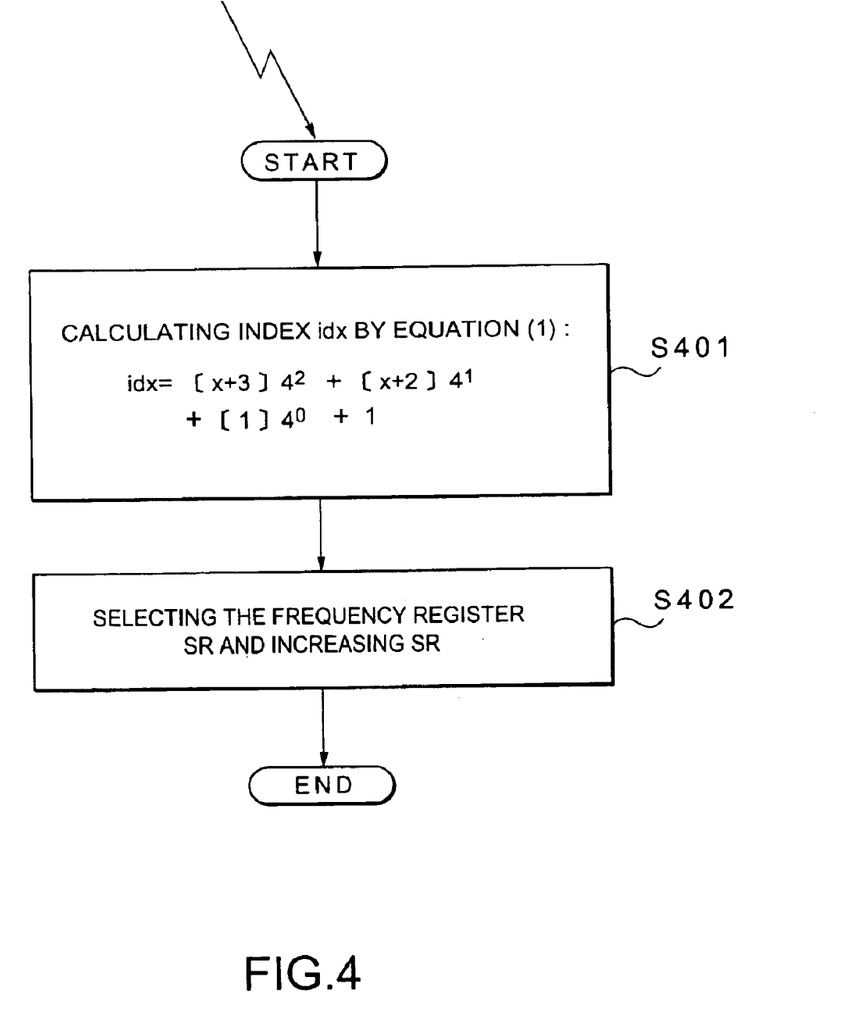
FIG. 4 shows a flow chart for use in describing operation of a frequency register indicator illustrated in FIG. 3.

In FIG. 4, the frequency register indicator 320 is supplied from the frame rate input register 300 with the contents [1], [x+2], and [x+3] and starts operation in response to the frame clock sent from the clock generator 360. At a step S401, the frequency register indicator 320 carries out index calculation in accordance with Equation (1) which is given by:

$$idx=[x+3]4^2+[x+2]4^1+[1]4^0+1.$$

From Equation (1), it is readily understood that the index idx takes a value between 1 and 64 when each content [x+3], [x+2], and [1] takes either one of 0, 1, 2, and 3.

In the next frame search rate judgement portion 160 illustrated in FIG. 3, the index signal is sent to the frame rate frequency register section 310 which is structured by sixty-four frequency registers numbered from 311 to 3164. Practically, either one of the frequency registers 311 to 3164 that corresponds to the index idx is selected as a selected register SR by the index signal and is increased by one, as shown at a step S402 in FIG. 4. As a result, the selected frequency register SR is counted up each time when the corresponding state is detected by the frequency register indicator 320. This shows that a frequency or a degree of occurrence is successively counted by the selected frequency register SR under control of the frequency register indicator 320.

In Table 1, the contents [x+3], [x+2], and [1] of the frame rate input register 300 are concerned with the number of the frequency registers 311 to 3164. For example, when (x+3)-th, (x+2)-th, and the first stages of the frame rate input register 300 take 0, 0, and 0, respectively, the frequency register 311 is selected as the selected register SR while the frequency register 3164 is selected when the contents [x+3], [x+2], and [1] are equal to 3, 3, and 3, respectively. Likewise, 0, 1, and 0 of the (x+3)-th, (x+2)-th, and the first stages of the frame rate input register 300 are made to correspond to the frequency register 315. At any rate, the frequency register indicator 320 carries out calculation in accordance with Equation (1) and selects either one of the frequency registers 311 to 3164 on the basis of a result of calculation.

TABLE 1

| STAGE x + 3 | STAGE x + 2 | STAGE 1 | SELECTED REGISTER | STAGE x + 3 | STAGE x + 2 | STAGE 1 | SELECTED REGISTER |
| --- | --- | --- | --- | --- | --- | --- | --- |
| 0 | 0 | 0 | 1 | 2 | 0 | 0 | 33 |
| 0 | 0 | 1 | 2 | 2 | 0 | 1 | 34 |
| 0 | 0 | 2 | 3 | 2 | 0 | 2 | 35 |
| 0 | 0 | 3 | 4 | 2 | 0 | 3 | 36 |
| 0 | 1 | 0 | 5 | 2 | 1 | 0 | 37 |
| 0 | 1 | 1 | 6 | 2 | 1 | 1 | 38 |
| 0 | 1 | 2 | 7 | 2 | 1 | 2 | 39 |
| 0 | 1 | 3 | 8 | 2 | 1 | 3 | 40 |
| 0 | 2 | 0 | 9 | 2 | 2 | 0 | 41 |
| 0 | 2 | 1 | 10 | 2 | 2 | 1 | 42 |
| 0 | 2 | 2 | 11 | 2 | 2 | 2 | 43 |
| 0 | 2 | 3 | 12 | 2 | 2 | 3 | 44 |
| 0 | 3 | 0 | 13 | 2 | 3 | 0 | 45 |
| 0 | 3 | 1 | 14 | 2 | 3 | 1 | 46 |
| 0 | 3 | 2 | 15 | 2 | 3 | 2 | 47 |
| 0 | 3 | 3 | 16 | 2 | 3 | 3 | 48 |
| 1 | 0 | 0 | 17 | 3 | 0 | 0 | 49 |
| 1 | 0 | 1 | 18 | 3 | 0 | 1 | 50 |
| 1 | 0 | 2 | 19 | 3 | 0 | 2 | 51 |
| 1 | 0 | 3 | 20 | 3 | 0 | 3 | 52 |

TABLE 1-continued

| STAGE x + 3 | STAGE x + 2 | STAGE 1 | SELECTED REGISTER | STAGE x + 3 | STAGE x + 2 | STAGE 1 | SELECTED REGISTER |
|---|---|---|---|---|---|---|---|
| 1 | 1 | 0 | 21 | 3 | 1 | 0 | 53 |
| 1 | 1 | 1 | 22 | 3 | 1 | 1 | 54 |
| 1 | 1 | 2 | 23 | 3 | 1 | 2 | 55 |
| 1 | 1 | 3 | 24 | 3 | 1 | 3 | 56 |
| 1 | 2 | 0 | 25 | 3 | 2 | 0 | 57 |
| 1 | 2 | 1 | 26 | 3 | 2 | 1 | 58 |
| 1 | 2 | 2 | 27 | 3 | 2 | 2 | 59 |
| 1 | 2 | 3 | 28 | 3 | 2 | 3 | 60 |
| 1 | 3 | 0 | 29 | 3 | 3 | 0 | 61 |
| 1 | 3 | 1 | 30 | 3 | 3 | 1 | 62 |
| 1 | 3 | 2 | 31 | 3 | 3 | 2 | 63 |
| 1 | 3 | 3 | 32 | 3 | 3 | 3 | 64 |

Each of the frequency registers 311 to 3164 is formed by first through y-th memory cells (depicted by "1" to "y" in FIG. 3) each of which is counted up to a maximum value z. Each value of the memory cells 1 to (y−1) is moved rightwards of FIG. 3 each time when a z frame clock zclk is given from the clock generator 360 to the frame rate frequency register section 310. Thus, each of the frequency registers 311 to 3164 serves to store a frequency data signal representative of the frequency or appearance of the corresponding states of the frame rate input register 300. In the illustrated example, each of the frequency registers 311 to 3164 can be loaded with the frequency data signal up to an amount of (yz). The frequency data signal of (yz) is used to calculate a next frame rate candidate in a manner to be described later. The next frame rate candidate is practically representative of a candidate of the latest received frame rate and therefore may be often called a latest frame rate candidate. From this fact, it is understood that the amount (yz) of the frequency data signal is used to statistically determine the next frame rate candidate in the illustrated example. With this structure, it is possible to shorten a length of each frequency register 311 to 3164 as the value z becomes large on the condition that the amount (yz) is invariable.

In FIG. 3, the memory cells 1 to z of each frequency register 311 to 3164 are connected to the next frame rate candidate calculator 330. Thus, the contents of the memory cells 1 to z of each frequency register 311 to 3164 are sent to the next frame rate candidate calculator 330.

The next frame rate candidate calculator 330 successively extracts the contents of each frequency register 311 to 3164 to calculate the next frame rate candidate from the extracted contents in a manner which will be described in conjunction with FIGS. 5 and 6.

Thereafter, the next frame rate candidate is successively delivered from the next frame rate candidate calculator 330 to the next frame rate candidate register section 350 which is formed by first through sixteenth candidate registers 351 to 3516. Each of the first through the sixteen candidate registers 351 to 3516 is operable to successively store or renew next frame rate candidate values in a manner to be described.

Thus, the frame rate input register 300, the frequency register indicator 320, the frame rate frequency register section 310, and the next frame rate candidate calculator 330 are operable to statistically process the previous frame rates to produce the result of statistical processing as the next frame rate candidate and may therefore be referred to as a processing circuit.

The next frame rate candidate values are sent from the first through the sixteenth candidate registers 351 to 3516 to the next frame rate selector 340. The illustrated next frame rate selector 340 is connected to the first and the second stages 1 and 2 of the frame rate input register 300 and selects either one of the next frame rate candidate values by using the contents [1] and [2] of the first and the second stages 1 and 2. The selected next frame rate candidate value is supplied from the next frame rate selector 340 to the data burst randomizer (DBR) 170. Thus, the next frame rate candidate register 350 and the next frame rate selector 340 are operable to predict the latest frame rate and may be called a prediction circuit.

At any rate, the frame rate input register 300, the frequency register indicator 320, the frame rate frequency register section 310, the next frame rate candidate calculator 330, the next frame rate candidate register section 350, and the next frame rate selector 340 serve to collectively predict the next frame rate of the next frame which arrives at the input terminal of the despread demodulator 100 by statistically processing the preceding frame rates detected by the decoder 150 (FIG. 1).

Figure 7:
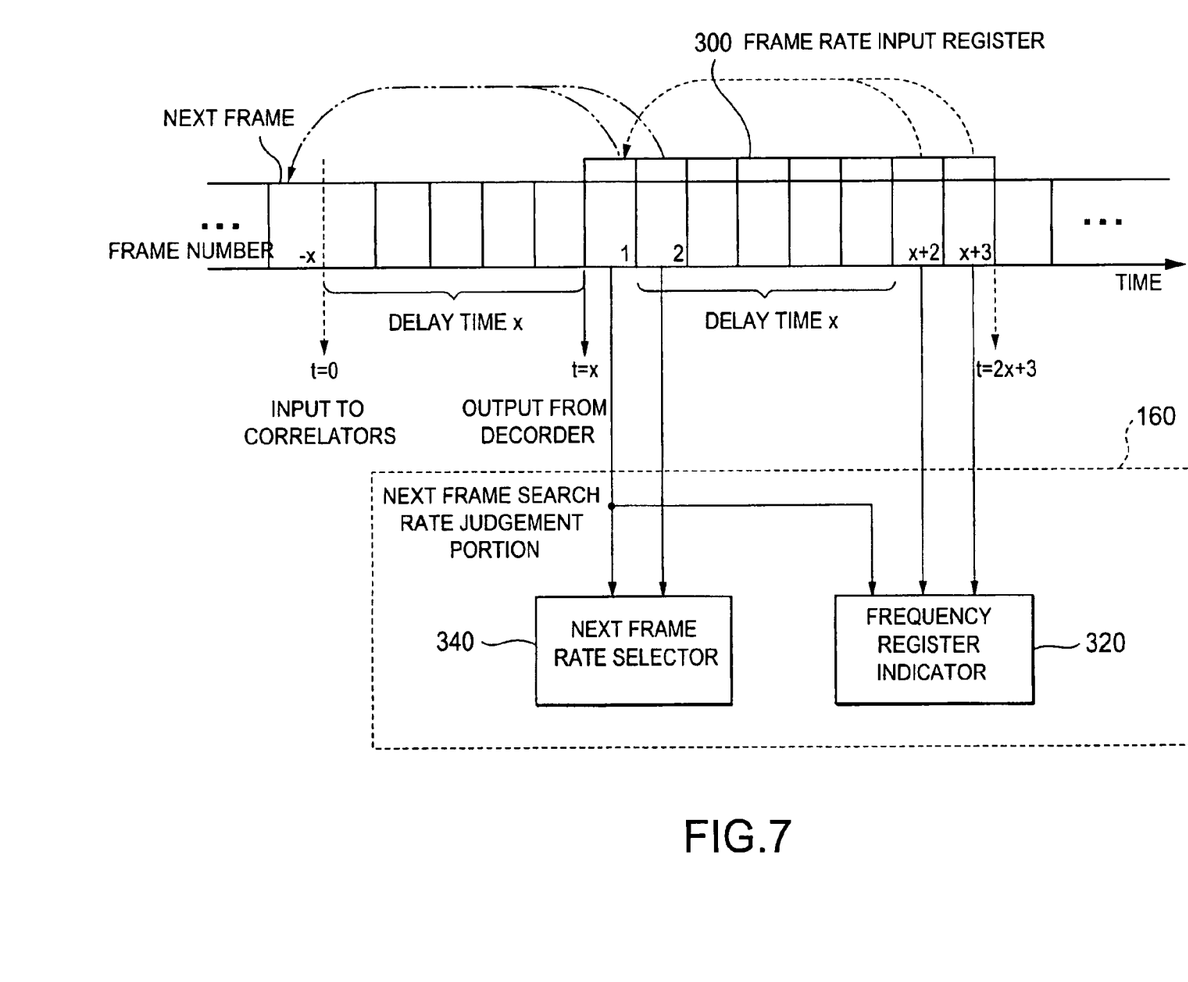
FIG. 7 shows a time chart for use in describing a principle of the next frame search rate judgement portion illustrated in FIG. 3.

Referring to FIG. 7, description will be made about a principle of a frame rate prediction operation according to the present invention. In FIG. 7, the frame rate input register 300, the frequency register indicator 320, and the next frame rate selector 340 alone are illustrated for simplicity of illustration.

The frame rate input register 300 has the first through (x+3)-th stages like in FIG. 3. The frame rate signal is detected by the decoder 150 in the current frame and is stored in the first stage 1 of the frame rate input register 300 to be successively shifted rightwards of FIG. 7 in response to the frame clock Fclk.

When the frame rate signal of the current frame is stored as the content in the first stage 1 of the frame rate input register 300, the (x+2)-th and the (x+3)-th stages are loaded as the contents with the frame rate signals of previous frames preceding the current frame by (x+1) and (x+2) frames, respectively.

In this event, it is to be noted that the first through the n-th correlators 111 to 11n are supplied with the baseband reception signal of the next frame that is spaced by the x-frames after the current frame and that is therefore depicted by (−x) in FIG. 7. Herein, it should be recollected that the delay time (−x) is equal to the difference between the processing time p and the delay time d of the delay unit 101.

The prediction operation of the next frame search rate judgement portion 160 is to predict the latest frame rate of the next frame, namely, the latest received frame (−x) with reference to the current frame rate and the frame rates of the previous frames (x+3) and (x+2).

Since the frame rate input register 300 has a length equal to the (x+3) frames, as illustrated in FIG. 7, a first relationship of delay times (frames) among the first frame (1), the (x+2)-th frame, and the (x+3)-th frame is identical with a second relationship of delay times among the next frame (−x), the first frame (1), and the second frame (2). Taking this into consideration, it is possible to predict the next frame rate of the next frame (−x) by statistically processing the first relationship.

For example, supposing that the (x+3)-th and the (x+2)-th stages of the frame rate input register 300 take the frame rates depicted by ra and rb, respectively. Herein, it is assumed that the current frame (1) spaced by the x frames from the (x+2)-th frame statistically takes a frame rate (depicted by rc) at the highest frequency. In addition, it is also assumed that the first relationship among the frame rates ra, rb, and rc is previously detected and stored in the next frame search rate judgment portion 160.

Under the circumstances, let the frame rates ra and rb be detected and stored in the second and the first stages (2) and (1) of the frame rate input register 300, respectively. In this event, the next frame rate of the next frame (−x) may be predicted as rc at the highest probability by the use of the first relationship. Thus, the second relationship is reasonably predicted in the illustrated example by using the first relationship previously detected.

As mentioned before, each frame rate, such as ra, rb, and rc, takes either one of the full rate, the half rate, the quarter rate, and the eighth rate that is sent from the decoder 150 to the frame rate input register 300. In the illustrated example, the full, the half, the quarter, and the eighth rates are represented by 0, 1, 2, and 3, respectively, as shown in Table 2, and may be expressed by two bits.

As readily understood from the above, the length or stage number of the frame rate input register 300 is determined by the processing time spent by a combination of the correlators 111 to 11n, the rake combiner 130, the deinterleaver 140, and the decoder 150, together with the additional delay time of the delay unit 101. Accordingly, the length, or the stage number of the frame rate input register 300 is obtained by calculating a difference (x-frames) subtracting, from the processing time p of processing the baseband reception signal, the additional delay time d of the delay unit 101 and by adding, to the x-frames, the number of 3 that is equal to the frame number Fnum. Each of the processing time p and the delay time d is specified by rounding up each processing and delay time at a frame unit.

Herein, it is preferable that the x-frames are not greater than three (3) frames because a prediction precision becomes worse with an increase of the value x.

On the other hand, it is possible to render the value of x equal to zero by lengthening the delay time d in the delay unit 101. In this event, it is noted that a property of each searcher 11i is deteriorated when the value of x becomes equal to zero. This is because the frame received by the correlators 111 to 11n is largely remote from the frame which is received by the searchers 121 to 12m and communication environments, such as fading, interference, might be seriously changed during the delay time d of the delay unit 101.

As mentioned with reference to FIG. 4 and Table 1, the frequency register indicator 320 shown in FIG. 1 is operable in a manner similar to an address decoder. Specifically, the frequency register indicator 320 selects one of the frequency registers 311 to 3164 with reference to the contents of the first, the (x+2)-th, and the (x+3)-th stages of the frame rate input register 300. Thereafter, the frequency register indicator 320 supplies the selected frame rate storage register with the increment signal. The resultant selected frame rate storage register is counted up to store the frequency of the states specified by the contents of the first, the (x+2)-th, and the (x+3)-th stages. Each of the frequency registers 311 to 3164 is shifted at every z-frame time.

Figure 5:
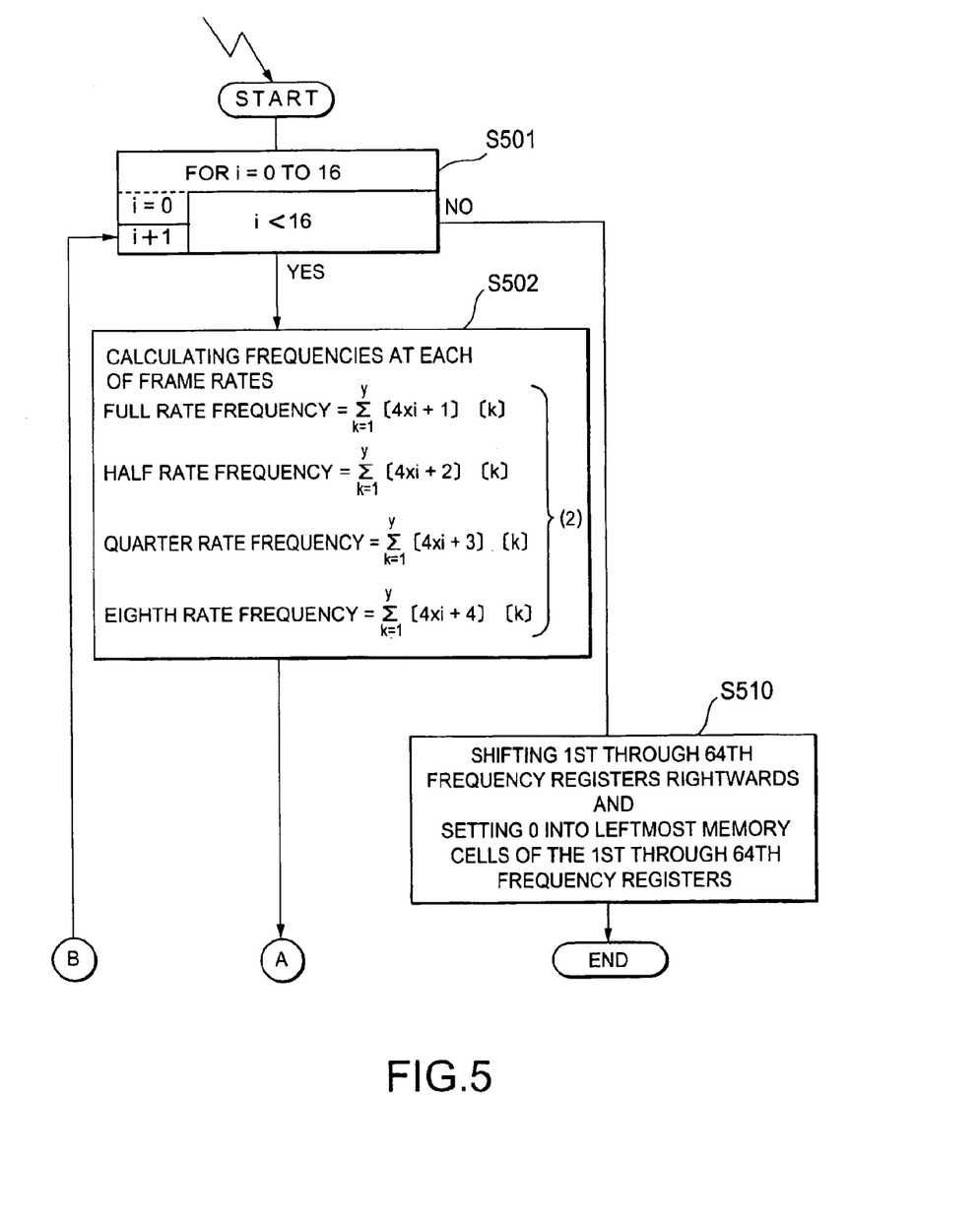
FIG. 5 shows a flow chart for use in describing a part of operation of a next frame rate candidate calculator illustrated in FIG. 3.
Figure 6:
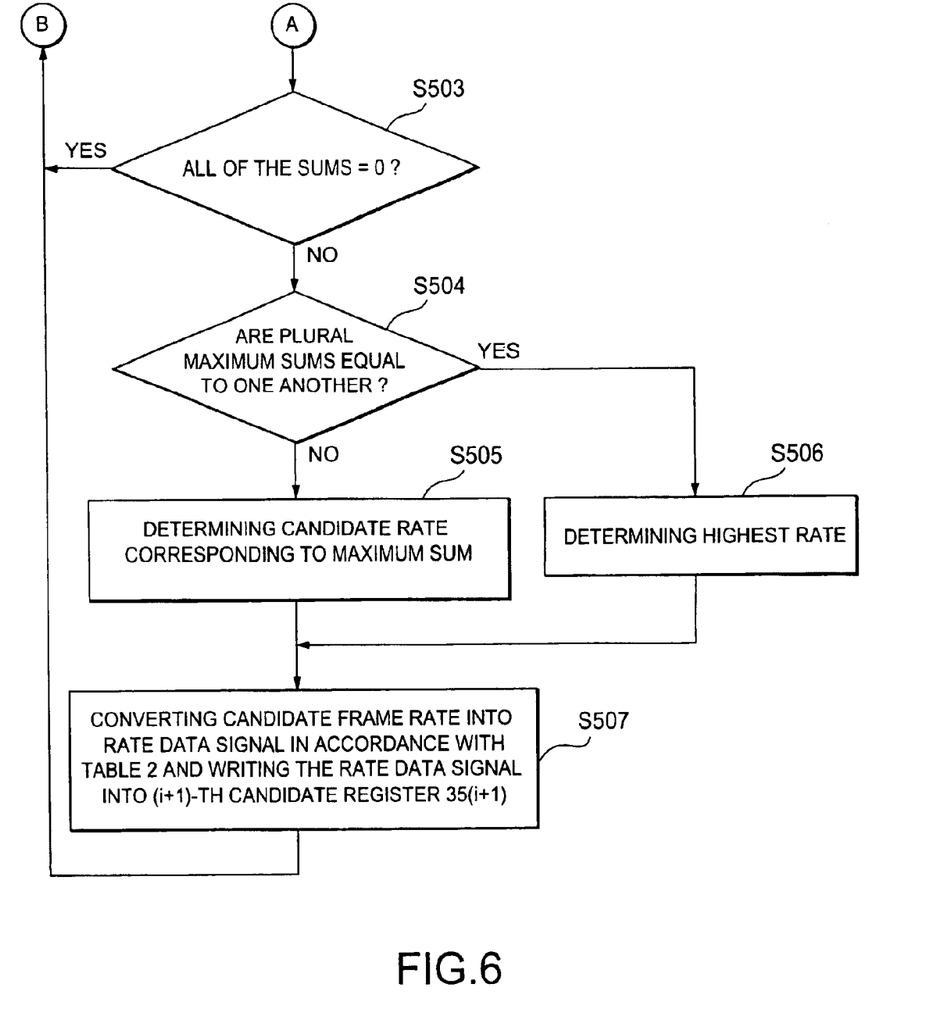
FIG. 6 shows a flow chart for use in describing another part of the operation of the next frame rate candidate calculator illustrated in FIG. 3.

Connected to the memory cells of each frequency registers 311 to 3164, the next frame rate candidate calculator 330 is operated in accordance with an algorithm shown in FIGS. 5 and 6 to calculate the next frame rate candidate as a result of calculation. The result of calculation is stored in the next frame rate candidate register section 350 in the manner mentioned before.

Referring to FIGS. 5 and 6, description will be made about operation of the next frame rate candidate calculator 330 on the assumption that the frame number Fnum and the frame rate number Rnum are equal to three and four, respectively. As shown in FIG. 3, the next frame rate candidate calculator 330 starts the operation in response to the zclk generated at every z-frame by the clock generator 360. In order to indicate each of the frequency registers 311 to 3164, a variable i is given at a step S501 and is judged by the next frame rate candidate calculator 330 about whether or not the variable i is smaller than 16. If the variable i is smaller than 16, the step S501 proceeds to a step S502.

At the step S502, the frequency registers 311 to 3164 which correspond to the variable i are indicated to calculate, at each frame rate, the frequencies stored in the frequency registers 311 to 3164. In the illustrated example, the frequencies of each of the full, half, quarter, and eighth rates are summed up from the first memory cell to the z-th memory cell of each frequency register 311 to 3164. For example, if the variable i is equal to zero, the first, second, third, and fourth frequency registers 311 to 314 are indicated by the next frame rate candidate calculator 330, as readily understood from Equation (2) shown in FIG. 5. Herein, the first, second, third, and fourth frequency registers 311 to 314 serve to calculate the frequencies of the full, half, quarter, and eighth rates, respectively.

TABLE 2

| Full Rate | 0 |
|---|---|
| Half Rate | 1 |
| Quarter Rate | 2 |
| Eighth Rate | 3 |

As shown in Tables 1 and 2, each of the full, half, quarter, and eighth rates is determined by the stage [1] of the frame rate input register 300 as long as the variable i takes zero.

At any rate, the next frame rate candidate calculator 330 calculate, at the step S502, first through fourth sums of the frequencies stored in the first through z-th memory cells in the first through fourth frequency registers 311 to 314.

After calculation of the sums, the step S502 is followed by a step S503 which is illustrated in FIG. 6. At the step S503, it is judged whether or not all of the first through fourth sums are equal to zero.

When all of the first through fourth sums are equal to zero, processing is returned back to the step S501 illustrated in FIG. 5. Otherwise, the step S503 is succeeded by a step S504 to detect a maximum one or ones of the first through fourth sums. Thereafter, judgement is made at the step S504 about whether or not a plurality of the maximum sums are equal to one another. When the plurality of the maximum sums are not present, the step S504 proceeds to a step S505. Otherwise, the step S504 is followed by a step S506.

At the step S505, the frame rate which exhibits the maximum sum detected at the step S504 is determined as the candidate frame rate. On the other hand, a highest rate is selected among the frame rates that have the maximum sums (frequencies) and is determined as the candidate frame rate at the step S506.

After the candidate frame rate is determined at the step S505 or the step S506, a step S507 is executed by the next frame rate candidate calculator 330 so as to convert the candidate frame rate into a rate data signal in accordance with Table 2. Namely, the full, half, quarter, and eighth rates are converted into "0", "1", "2", and "3", respectively, as shown in Table 2. Thereafter, the rate data signal is written into an (i+1)-th, namely, the first candidate register 351 at the step S507. Subsequently, the step S507 is succeeded by the step S501 so as to change the variable i from 0 to 1.

When the variable i is changed to 1, the frequencies of the fifth through eighth frequency registers 315 to 318 are summed up by the next frame rate candidate calculator 330 in the manner mentioned in conjunction with i=0.

When the variable i is equal to 1, the rate data signal is written into the second candidate register 352 of the next frame rate candidate register section 350. Likewise, the third through sixteenth candidate registers 353 to 3516 are successively loaded with the rate data signal within a single frame duration, as shown in Table 2.

If the variable i becomes equal to 16, the step SS01 in FIG. 5 is followed by a step S510 at which the first through sixty-fourth frequency registers 311 to 3164 are shifted rightwards under control of the next frame rate candidate calculator 330. Thereafter, the leftmost memory cells of the first through sixty-fourth frequency registers 311 to 3164 are cleared or loaded with 0. Thus, the operation of the next frame rate candidate calculator 330 is finished.

At any rate, the first through sixteenth candidate registers 351 to 3516 of the next frame rate candidate register section 350 successively store the rate data signals representative of the frame rate values shown in Table 2. This shows that the first relationship among the current frame (1), (x+2)-th, and (x+3)-th frames are statistically stored in the first through sixteenth candidate registers 351 to 3516. In other words, the frame rate values that have the highest probability in the current frame are predicted from the previous frame rate values in the (x+2)-th and (x+3)-th frames and stored in the first through the sixteenth candidate registers 351 to 3516 illustrated in FIG. 3.

In the interim, it should be recollected that the first relationship is similar to the second relationship among the frame (2), the current frame (1), and the next frame (-x), as mentioned in conjunction with FIG. 7. Under the circumstances, it is readily understood that the frame rate of the next frame (-x) can be accurately predicted by selecting either one of the frame rate values stored in the first through sixteenth candidate registers 351 to 3516 with reference to the frame rate values of the frame (2) and the current frame (1), as shown in FIG. 7.

Turning to FIG. 3, the next frame rate selector 340 is supplied with the frame rate values or frame data signals from the stages (2) and (1) of the frame rate input register 300. Inasmuch as each frame rate value takes either one of the four rates (full, half, quarter, and eighth rates), a combination of the frame rate values from the stages (2) and (1) can be specified by sixteen states. Taking this into consideration, either one of the first through the sixteenth candidate registers 351 to 3516 is selected by the next frame rate selector 340 in response to the frame rate values sent from the stages (2) and (1) of the frame rate input register 300.

Specifically, the next frame rate selector 340 selects one of the first through sixteen candidate registers 351 to 3516 in accordance with Table 3.

TABLE 3

| STAGE 2 | STAGE 1 | SELECTED CANDIDATE REGISTER # |
|---------|---------|-------------------------------|
| 0 | 0 | 351 |
| 0 | 1 | 352 |
| 0 | 2 | 353 |
| 0 | 3 | 354 |
| 1 | 0 | 355 |
| 1 | 1 | 356 |
| 1 | 2 | 357 |
| 1 | 3 | 358 |
| 2 | 0 | 359 |
| 2 | 1 | 3510 |
| 2 | 2 | 3511 |
| 2 | 3 | 3512 |
| 3 | 0 | 3513 |
| 3 | 1 | 3514 |
| 3 | 2 | 3515 |
| 3 | 3 | 3516 |

If the frame rate values [2] and [1] in the stages 2 and 1 are equal to 0 and 0, the first candidate register 351 is selected by the next frame rate selector 340 to read the frame rate value out of the first candidate register 351 and to send the to the DBR170 as a predicted next frame rate value in the next frame (-x). Likewise, the second candidate register 352 is selected by the next frame rate selector 340 when the frame rate values [2] and [1] in the stages 2 and 1 take (0, 1). In addition, the sixteenth candidate register 3516 is selected by the next frame selector 340 when the frame rate values [2] and [1] take (3, 3).

Thus, the selected frame rate value is supplied to the DBR 170 as the predicted next frame rate value.

With this structure, it is necessary to initialize the first through the sixteenth candidate registers 351 to 3516 by frame rate values that are attained by measuring the frame rate values for a long time.

Referring back to FIG. 1, the DBR (Data Burst Randomizer) 170 is supplied with the predicted next frame rate value and the spread code from the next frame search rate judgement portion 160 and the spread code generator 180, respectively. The spread code supplied from the spread code generator 180 delayed by a delay time equal to the additional delay time of the delay unit 101 and is thereafter delivered to the DBR 170 and the first through m-th searchers 121 to 12m. On the contrary, the first through n-th correlators 111 to 11n are given the spread code without any delay time.

The DBR 170 illustrated in FIG. 1 is given the predicted next frame rate value and the spread code delayed in the above-mentioned manner. The DBR 170 calculates, in accordance with a predetermined algorithm, a burst candidate slot which carries a data signal and which may be called an available slot.

According to the predetermined algorithm, it is prescribed that a burst candidate slot of a low rate is always also included in a burst candidate slot of a rate which is higher than the low rate.

For example, when each frame is composed of sixteen slots, burst candidate slot information of sixteen bits is used to indicate each burst candidate slot.

In this event, it is assumed that a logic "1" level is representative of the available slot. In this situation, eight bits take the logic "1" level in the sixteen bits when the half rate is set as the frame rate while only four bits of the sixteen bits take the logic "1" level when the quarter rate is set. Likewise, two bits alone take the logic "1" level in the sixteen bits when the eighth rate is set.

The DBR 170 is connected to the demodulation control portion 190, as illustrated in FIG. 1, so as to control the despread demodulator 100. To this end, the demodulation control portion 190 supplies the first through m-th searchers 121 to 12m of the despread demodulator 100 with a start time and a time width for searching operation. Each of the first through m-th searchers 121 to 12m (collectively depicted by 12i) informs the despread demodulator 100 of a time at which a peak appears within the predetermined time width on completion of the search operation. Thus, a combination of the DBR 170, the demodulation control portion 190, and the searchers 121 to 12m may be referred to as an executing circuit for executing a predetermined operation by the use of the predicted frame rate or candidate rate value.

In the despread demodulator 100, each searcher 12i supplies a result of the searching operation to the first through n-th correlators 111 to 11n so that the rake combiner 130 exhibits maximum energy-to-noise (Eb/No) ratio. The above-mentioned burst candidate slot information serves to determine the start time of each searcher 12i. At any rate, the despread demodulator 100 is controlled by the demodulation control portion 190 in the manner mentioned in conjunction with FIG. 2.

While this invention has thus far been described in conjunction with a few embodiments thereof, it will be readily possible for those skilled in the art to put this invention into practice in various other manners. For example, the frame rate may not be restricted to four rates while more than three contents of the frame rate input register 300 are given to the frequency indicator 320 so as to carry out statistical processing in accordance with the first relationship. In this case, the next frame rate selector 340 is given the contents of the frame rate input register 300 in consideration of the first relationship. In addition, this invention may not be limited to the statistical processing in the DS-CDMA. Although description has been made about the wireless communication device which is used in the base station, the wireless communication device according to this invention may be used in a mobile radio terminal communicable with the base station.

What is claimed is:

1. A wireless communication device for use in a DS/CDMA mobile communication system, the wireless communication device being operable in response to a sequence of reception signals divisible into a plurality of frames each of which has a frame rate and which is further divided into a plurality of slots, the reception signal sequence being processed with a processing time and a delay time in the wireless communication device, comprising:

processing means for statistically processing preceding frame rates in previously received ones of the frames to produce a result of statistical processing, the previously received frames being determined on the basis of a time difference between the processing time and delay time;

predicting means for predicting a later one of the frame rates in a next one of the frames on the basis of the result of statistical processing to produce a predicted frame rate of the later one of the frame, the next frame being determined with reference to the time difference between the processing time and the delay time; and executing means for executing a predetermined operation within candidate ones of the slots determined for the predicted frame rate.

2. A wireless communication device as claimed in claim 1, wherein the result of statistical processing is successively renewed so as to be matched with a variation of environment.

3. A wireless communication device as claimed in claim 1, wherein the executing means comprises:

a spread code generator for generating a spread code; and a calculating unit for calculating the candidate slots from the predicted frame rate and the spread code.

4. A wireless communication device as claimed in claim 3, wherein the executing means further comprises:

a demodulating unit for demodulating the reception signal with reference to the candidate slots into a demodulated signal.

5. A method for use in a wireless communication device to predict a frame rate in a selected one of frames that follows a reference frame with a reference frame rate, comprising the steps of:

statistically processing the reference frame rate and a previous frame rate of a previous frame preceding the reference frame to calculate a frame rate candidate in the selected one of the frames, the preceding frame being determined on the basis of a delay time which is needed in the wireless communication device; and producing the frame rate candidate as the frame rate predicted.

6. A method as claimed in claim 5, wherein the statistically processing step comprises:

successively storing the previous and the reference frame rates;

accumulating each combination of the previous and the reference frame rates to statistically detect a frequency of each combination; and obtaining the frame rate candidate by using the frequency of each combination.

7. A circuit operable in response to a sequence of frame rate signals derived from a sequence of reception signals in a wireless communication device of a mobile communication system, the reception signal sequence being processed with a processing time and a delay time in the wireless communication device and including a reference frame, a previous frame sequence preceding the reference frame, and a later frame following the reference frame while the circuit is used for calculating a later frame rate of the later frame, comprising:

processing means for statistically processing a reference frame rate extracted from the reference frame and a previous frame rate extracted from the preceding frame sequence selected with reference to a time difference between the processing time and the delay time to successively store a frame rate candidate in the later frame as a result of statistically processing; and selecting means for selecting the frame rate candidate from the later frame determined with reference to the time difference to produce the frame rate candidate as the later frame rate.

8. A circuit as claimed in claim 7, the wireless communication device having a processing time for decoding the reception signal sequence into a sequence of reception signals, wherein the processing means comprises:

an input register which has a plurality of stages successively loaded with each frame rate extracted from the reception signal sequence at each frame;

a frequency storage section, coupled to a plurality of the stages of the input register dependent on the processing time, for successively storing a combination of the frame rate given from the reference and the previous frame rates;

a candidate calculator for calculating the frame rate candidate of the later frame by statistically detecting frequencies of each combination; and a candidate register for successively registering the frame rate candidate of the later frame.

9. A circuit as claimed in claim 8, wherein the selecting means comprises:

a later frame selector, coupled to the stages of the input register that are dependent on the processing time, for selecting the frame rate candidate by a combination of the frame rates derived from the stages of the input register.

10. A circuit as claimed in claim 8, the wireless communication device being also operable in response to a delayed signal which is delayed by a delay time relative to the reception signal sequence, wherein the frequency storage section is coupled to the plurality of the stages of the input register that are determined by a difference between the processing time and the delay time.

11. A circuit as claimed in claim 9, wherein the later frame selector is coupled to the plurality of the stages of the input register that are also determined by the difference between the processing time and the delay time.

12. A circuit as claimed in claim 9, wherein the plurality of the stages of the input register to which the frequency storage section is coupled are defined as a first relationship in consideration of the difference between the processing and the delay times while a relationship among the frame rate candidate stored in the candidate register and the stages of the input register to which the later frame selector is coupled is specified by a second relationship similar to the first relationship.

13. A circuit as claimed in claim 10, wherein the difference between the processing and the delay times is not greater than a time duration of three frames.

14. A circuit as claimed in claim 13, wherein each of the current, the previous, and the later frame rates is selected from four different frame rates.

15. A circuit as claimed in claim 8, wherein the frequency storage section has a plurality of frequency registers which are determined in number by the four frame rates and the number of the stages of the input register to which the frequency storage section is coupled.

16. A circuit as claimed in claim 15, wherein the frequency registers are equal in number to sixty-four when the number of the stages of the input register is equal to three.

17. A circuit as claimed in claim 15, wherein each of the frequency registers has first through y-th memory cells, where y is an integer.

18. A method of predicting a latest frame rate of a latest received frame from preceding frame rates, comprising the steps of:

extracting a sequence of frame rate signals from a sequence of reception signals; and predicting the latest frame rate of the latest received frame by processing previous ones of the frame rate signals preceding the latest received frame in consideration of a delay time for extracting the frame rate signal sequence, used for controlling a searcher included in a wireless communication device of a CDMA communication system, further comprising the step of:

supplying the latest and predicted frame rate through a data burst randomizer to the searcher.

19. A method as claimed in claim 18, wherein the delay time is determined by a difference between a processing time in the wireless communication device and an additional delay time given a delay unit which delays the reception signal sequence.

20. A method as claimed in claim 19, wherein the predicting step comprises the steps of:

successively registering the frame rate signals in an input register;

detecting a combination of the frame rate signals from the registered frame rate signals by selecting stages of the input register in consideration of the delay time to store a frequency of each, combination;

calculating a later frame rate candidate from the frequencies of the combinations; and selecting the later frame rate from the later frame rate candidate in consideration of the delay time.

21. A method as claimed in claim 19, wherein the stages of the input register selected at the detecting step provide a first relationship while the later frame rate is selected by using a second relationship similar to the first relationship.

* * * * *